United States Patent Office 3,229,990
Patented Jan. 18, 1966

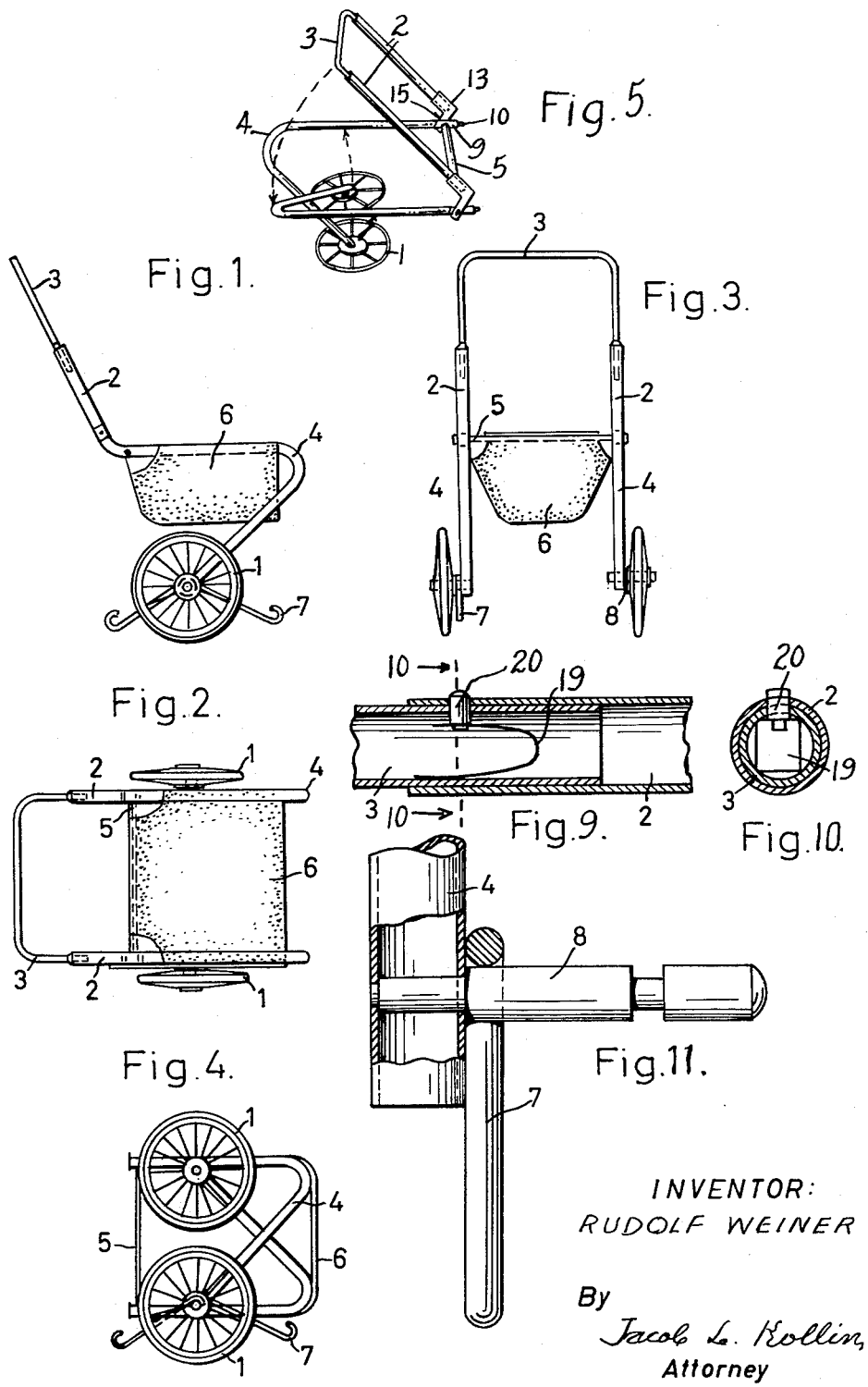

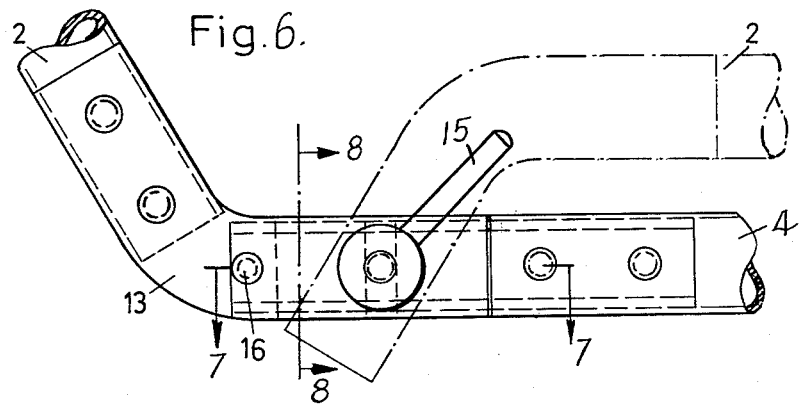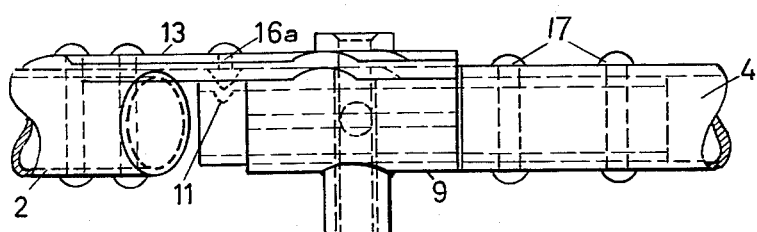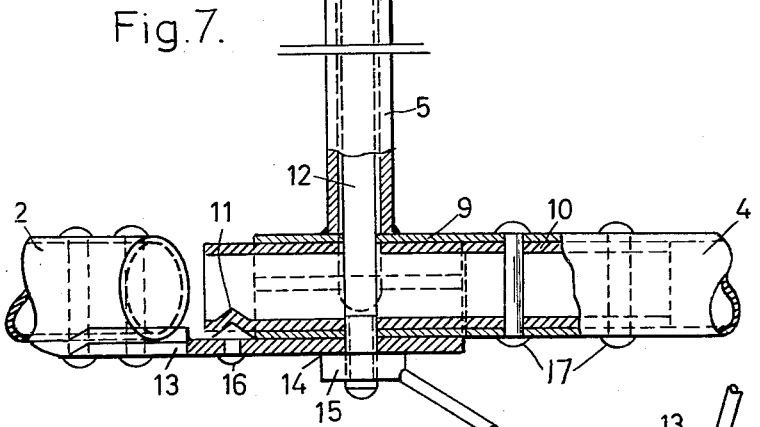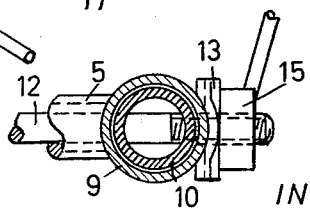

3,229,990
COLLAPSIBLE HAND CART
Rudolf Weiner, Danzigen Strasse 62, Friedberg, Hessen, Germany
Filed Nov. 4, 1963, Ser. No. 321,037
Claims priority, application Germany, Nov. 9, 1962, W 33,297
4 Claims. (Cl. 280—40)

The invention relates to a hand operable, portable hand cart which is provided with wheels and which may be folded together as a narrow flat package occupying very little space. Known collapsible hand carts require considerably more space when these are folded. They are comparatively unwieldy and heavy, or are not sufficiently stable to assure regular use in swung open condition.

In the collapsible hand cart according to the invention, the undercarriage comprises a preferably U-shaped telescoping and also extensible supporting and transport frame. At each of both free ends of the supporting and transport frame there is included a V-shaped carrier brace for the wheel, secured to its lower end. Both side parts of this transport frame are held by a cross brace. Between the two carrier braces held by the cross-brace, is a bag, a seat or a similar construction made of a flexible, easily foldable material, in which may be placed the goods to be transported or a small child to be wheeled may be seated. As material for this bag or seat there may be employed canvas, a rubberized net with or without lining, a plastic web, a plastic sheet or similar material. According to the invention there are further provided supports at both side parts of the frame which make it possible to swing open the support frame in the plane of the V-shaped support braces, and swing these closed over one another towards the upper brace of both V-shaped supports in this plane. Advantageously, the swinging braces, as well as the support for both V-shaped braces is at the changeover positions of the cross brace which is disposed near the rearward free ends of both V-shaped support braces. According to the invention there are provided detent means which assure the position of the riding frame parts in the riding operating position and in substantially the same plane in the collapsed position.

The construction is thus extraordinarily simple. Only a pair of braces joined at one central point by a link are required. The axes through these central points make it possible to maintain in the desired opposed collapsed or erected position both hinged frame braces.

In the accompanying drawing illustrating an embodiment of the invention in the form of a child's cart, FIG. 1 is a side view of the cart in erected position;
FIG. 2 is a bottom plan view thereof;
FIG. 3 is a rear view of the cart;
FIG. 4 is a top plan view of the cart in collapsed position;
FIG. 5 illustrates an intermediate folding position of the device;
FIG. 6 is an enlarged detail of the mechanism for collapsing and wheeling positions;
FIG. 7 is a cross-section view taken on line 7—7 of FIG. 6;
FIG. 8 is a cross-section view taken on line 8—8 of FIG. 6;
FIG. 9 is an enlarged detail of the insertion mechanism of the cart;
FIG. 10 is a cross-section taken on line 10—10 of FIG. 9 and
FIG. 11 is a lower partial plan view, partly in section of two V-shaped support braces including the axle for the wheels.

Referring now to the drawings in detail, the collapsible hand cart according to the invention is mounted on a pair of wheels 1 and provided with a mobile frame consisting of two tubular side arms 2 into which are telescoped an adjustable supporting and carrying brace 3 in the form of a U-shaped cross bar a pair of V-shaped supporting braces 4 are pivotally secured to a tubular cross-brace 5. Both side parts are held at a desired distance from one another by the tubular cross-brace 5. Suspended on the upper edges of the support braces 4 is the seat 6 of strong foldable material. The cart is secured against overturning by a support 7, the details of which are shown in FIG. 11. The support 7 is welded to one of the axles 8 at the lower end of the V-shaped support brace 4, the wheels 1 being mounted on said axles. The support 7 is folded with the frame part when the latter is folded into the rest position, as shown in FIG. 4. The tubular cross-brace 5 is provided at both of its ends with slotted sockets 9 surrounding the upper shanks of both V-shaped support braces 4. The sockets 9 are provided with extensions which pivot in cross-bar 5 and serve simultaneously as retractable supports for the V-shaped support braces 4. For this purpose both free ends of the upper shanks of the V-shaped support frame 4 are provided with reenforcing tube inserts 10, secured thereto with rivets 17 projecting through the free ends of the V-shaped frame which is provided with appropriate recesses. The reenforcing tube inserts are provided with slots over a circumferential angle of about 90° to enable both V-shaped support frames to swing about the legs 13 of the side arms so that they may be on one another in a substantially horizontal plane. The pressure bar 12 also acts as a support for collapsing the tubes 2 and braces 3. This purpose is served by the bent legs 13 rigidly secured to the corresponding side surfaces to one side of each of the tubular side arms 2. The legs 13 come in contact with each of the V-shaped supporting braces 4 when the cart is opened and thus brought into operating position. The positions for the collapsing supports are the bores 14 of the sleeves 9 and the legs 13 through which projects the pressure rod 12. This pressure rod serves likewise for securing the cart in an open position. Additionally, one end of the pressure rod 12 is provided with an outer thread for screwing on the clamp lever 15. Pins 16 are adapted to engage in recessed portions or depressions 11 and are secured to the legs 13.

Both the operative and the collapsed positions of the cart are secured by first loosening the clamp lever. The locking pressure exerted by the clamp lever 15 on the legs 13 is thus released. The supports 2 and the handle 3 can now be swung to a working or collapsed position whereupon the locking lever 15 is tightened again thus resulting in a friction lock. The locking of the ends of the V-shaped carrier rod 4 results from the same manipulation. The operating position assures the engagement of pin 16 in the recesses 11. As soon as the clamp lever 15 is unscrewed, the V-shaped support braces 4 are released by the disengagement from stops 11 of pins 16 which held them in the open operating position shown in FIG. 6 and can be swung upon one another into the closed position shown in FIG. 4 without any further effort. During the closing the U-shaped brace 3 is again telescoped into both side tubes 2. To this end there are inserted in both ends of the U-shaped brace 3, V-shaped bent leaf springs 19 to which are secured detent pins 20, as shown in FIGS. 9 and 10. As these detent pins are depressed manually, the U-shaped brace 3, may be moved into both side tubes 2 and thereby be assembled to the same extent that the support braces 2 and 3 had to be brought before they were collapsed. To erect the cart from the position shown in FIG. 4, the clamp lever 15 is loosened, then the collapsed support and brace are raised, the U-shaped brace is pulled out into the position shown in FIGS. 1–3, the two V-shaped support braces 4 are swung sideways 90° ahead of one another and the clamp lever 15 is again tightened.

To collapse the hand cart, the above steps are made in reverse order.

What I claim is:

1. A collapsible, hand operable cart, comprising, in combination, a pair of V-shaped tubular braces, each of said braces consisting of a horizontal member and a downwardly angularly extending tubular member integral therewith, a cross bar, first pivot means for securing said braces to said cross bar in aligned spaced parallel planes, said braces being pivotable about said first pivot means into overlapping planes substantially transverse to said parallel planes, said first pivot means comprising a pair of sockets secured transversely to the ends of said cross bar, a pair of tube inserts secured to the ends of said horizontal members and pivotally received in said sockets, each of said inserts being provided with slots extending over a circumferential angle of 90° and with a recessed portion adjacent its end, a pressure bar extending through said cross brace and through said slots, said pressure bar being provided with clamp means for securing said inserts in a desired plane relative to said cross bar, a U-shaped handle, second pivot means securing the horizontal member ends to the legs of said U-shaped member for pivoting said U-shaped member into a plane transverse to said parallel planes, a pair of axles secured to the ends of said downwardly extending members respectively, a pair of wheels secured to said axles, a ground support member for the cart, secured to one of said axles and a bag of foldable material secured to said horizontal members and said cross bar.

2. The cart according to claim 1, wherein said handle comprises a pair of spaced tubes, each of said tubes having a peripheral aperture therein, a tubular U-shaped brace displaceably received in said tubes, a V-shaped leaf spring in each of the ends of said U-shaped brace and a detent pin secured to each of said springs and adapted to engage in said aperture.

3. The cart according to claim 1 wherein said clamping means includes a clamping lever and thread means for displacing said lever on said pressure bar.

4. The cart according to claim 1, wherein said legs are pivotally mounted on said pressure bar, said legs being provided with detent pins adapted to engage in said recessed portions.

References Cited by the Examiner

UNITED STATES PATENTS

| | | | |
|---|---|---|---|
| 1,114,314 | 10/1914 | Turner | 280—40 |
| 1,409,838 | 3/1922 | Emery et al. | 280—40 |
| 2,474,964 | 7/1949 | White | 280—47.25 |
| 2,657,069 | 10/1953 | Quist | 280—40 |

ARTHUR L. LA POINT, *Primary Examiner.*